May 15, 1934.   W. R. HORSFIELD   1,959,238
SORTING DEVICE
Filed Feb. 28, 1930   3 Sheets-Sheet 1

Inventor:
Walter R. Horsfield,
by Charles E. Tullar
His Attorney.

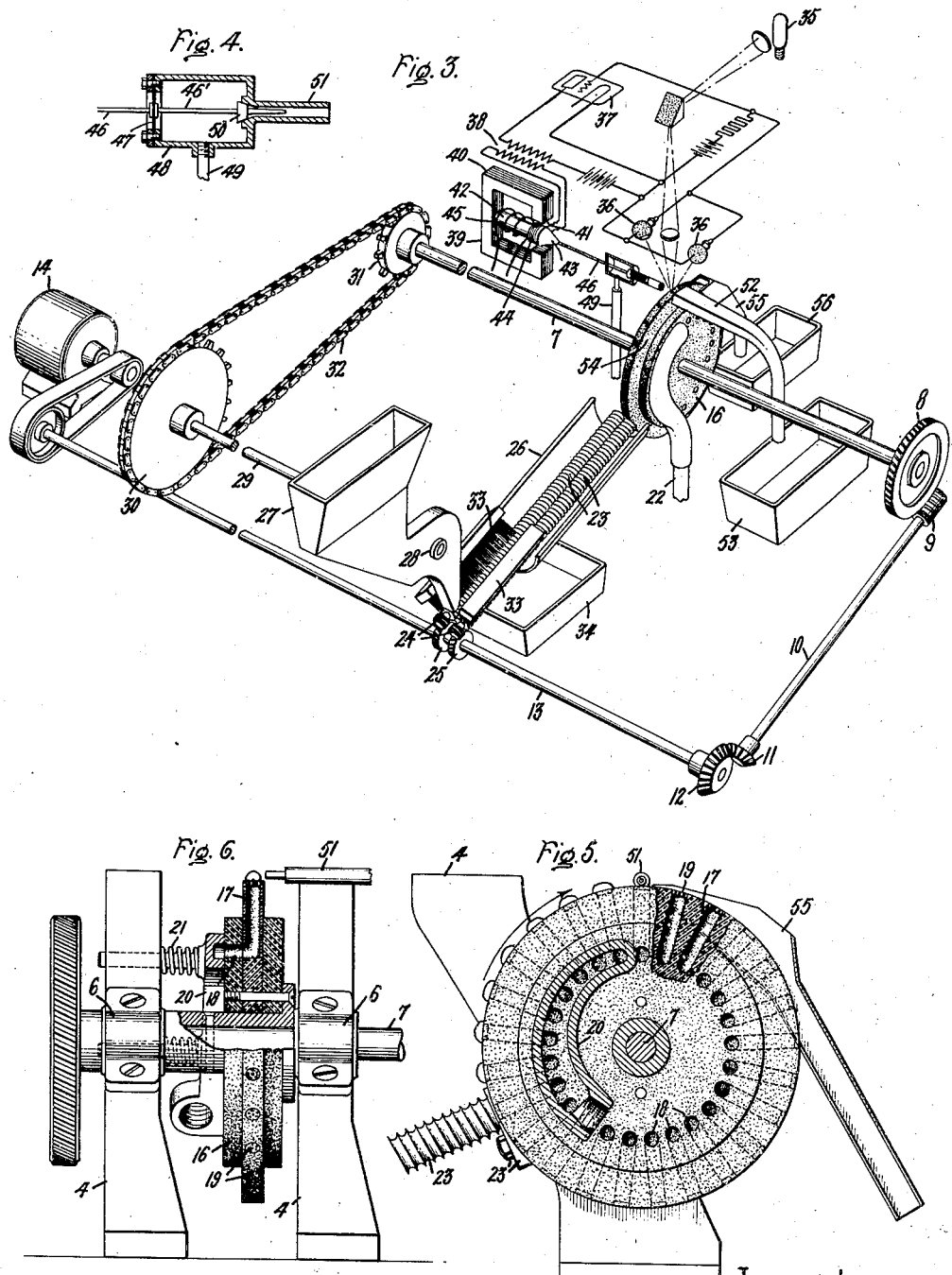

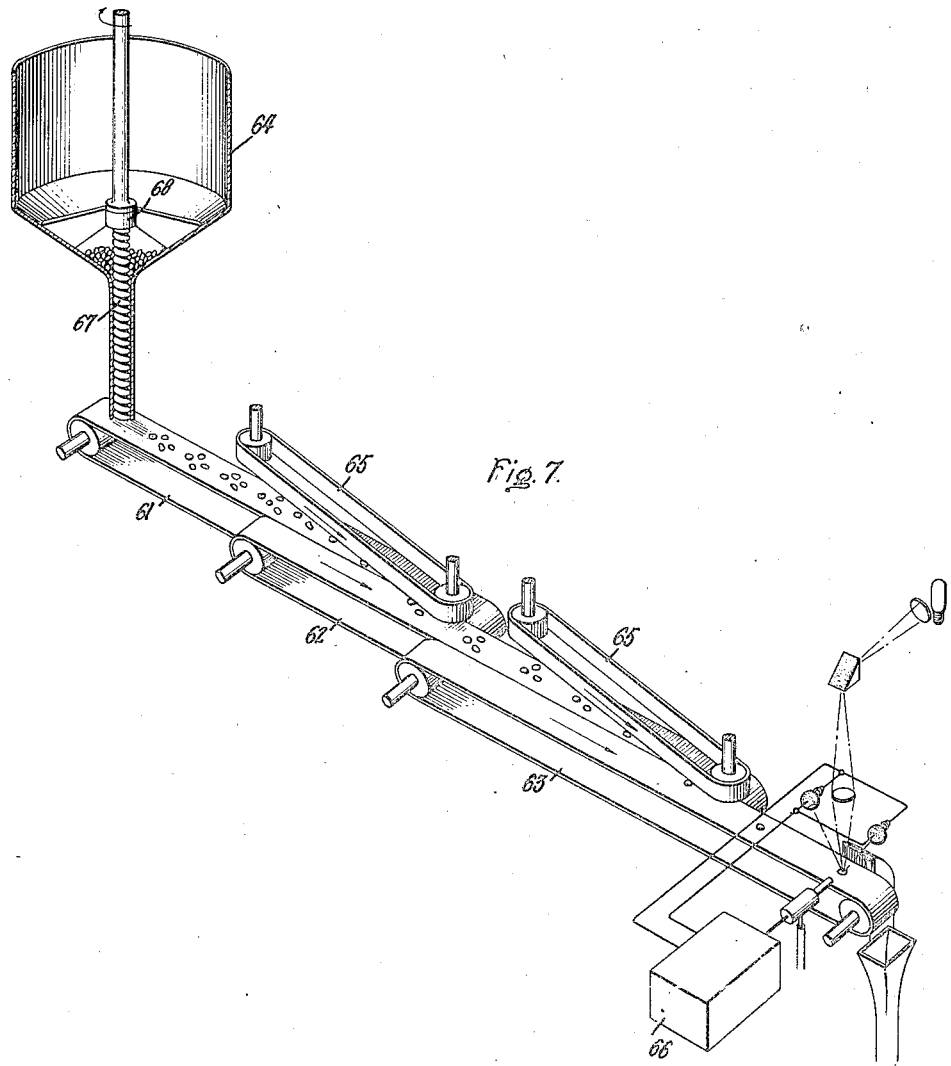

Patented May 15, 1934

1,959,238

UNITED STATES PATENT OFFICE 1,959,238

SORTING DEVICE

Walter R. Horsfield, Boston, Mass., assignor to General Electric Company, a corporation of New York Application February 28, 1930, Serial No. 432,225

7 Claims. (Cl. 209—111)

The present invention relates to sorting apparatus and more particularly to devices for automatically sorting objects of various colors.

In the arts, there frequently arises the necessity of selecting from a given quantity of objects of various colors or representative colors or shades, objects which conform to certain color or shade standards. For example, in coffee bean grading, it is desirable to sort the good beans, which prior to roasting may take on a green, yellow or other color according to the variety, from the bad beans, which are often black, or from foreign matter of various colors such as small pebbles, shells, etc. Moreover, the roasting process does not always lend the same color to each of the beans but gives to the majority a deep brown or chocolate appearance, while the remainder may take on any other hue or shade, lighter or darker than the other beans. Thus, it is necessary to sort out and reject from the mass of beans prior to roasting and, if desired, also subsequent to roasting, those beans or materials which do not conform to a given color standard indicative of a first quality assortment. Heretofore, the selecting process was performed entirely by hand which necessarily was slow and inaccurate inasmuch as the art of comparison with the color standard was a matter of personal judgment and experience.

An object of the present invention is to provide an improved means whereby objects may be automatically selected according to color or shade. Another object is to increase the speed and accuracy with which the objects may be selected on the color basis, while a more specific object is to sort from a miscellaneous quantity of beans, the beans whose color identifies them as being different in quality, i. e. superior, inferior or of equal quality with a predetermined standard.

Figure 1:
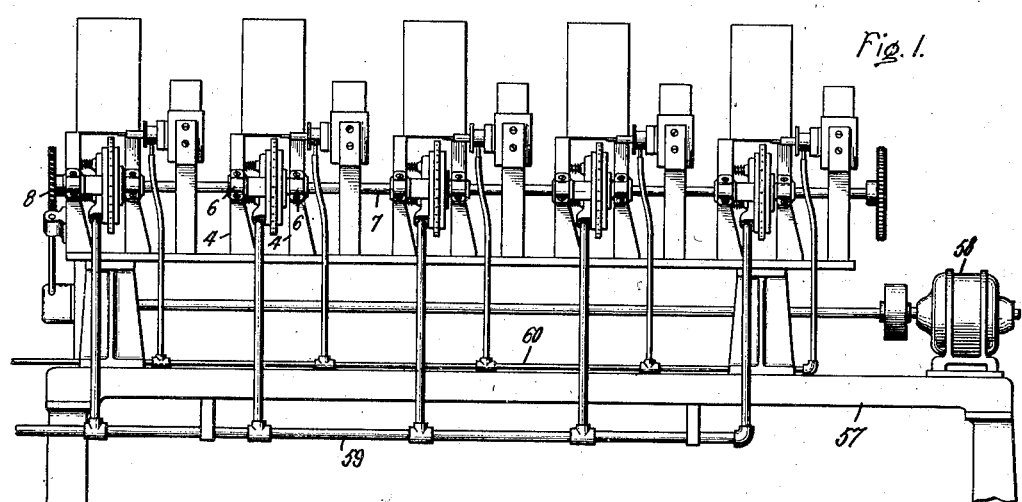
Figure 2:
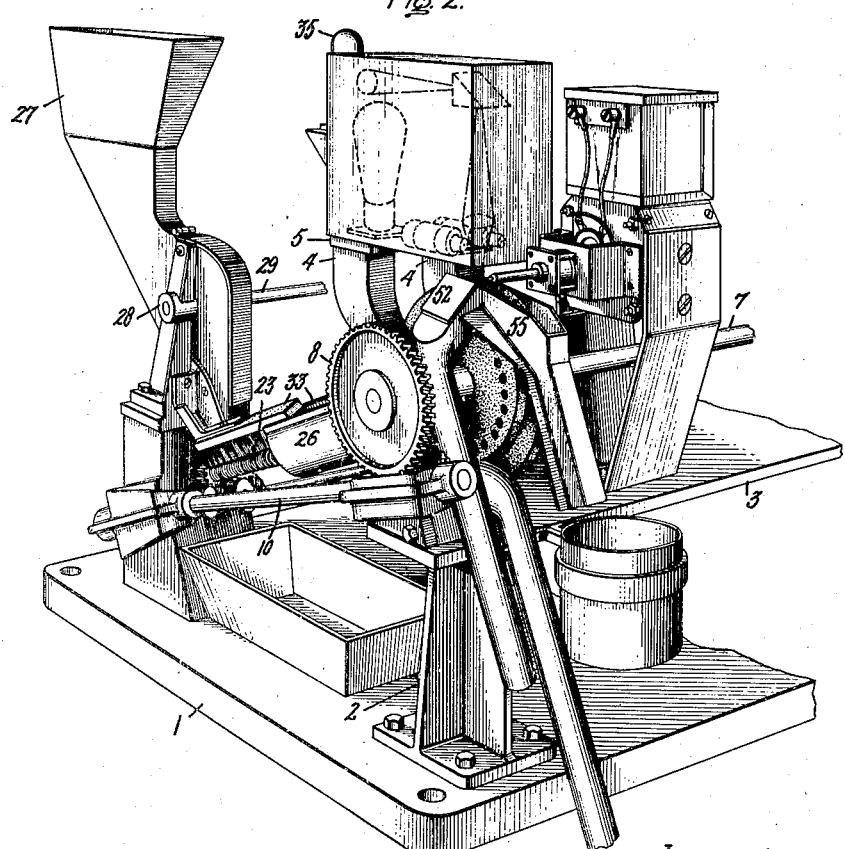

In carrying out my invention, advantage is taken of the reflection light principle in that the objects are presented individually to a light beam and the quantity of light reflected by the surface which represents a measure of color is caused to impinge upon a photo-electric tube, the photo-currents may be amplified in any suitable manner and caused to operate a selecting device which serves to separate the beans or other objects into two or more groups according to the amount of light reflected by each bean or object. The mechanism for presenting the objects to the light beam consists preferably of a rotary plate member and a suitable conveyor, the arrangement being such that the beans are separated from the mass into units and placed individually and in a uniform manner on the periphery of the rotating plate member. When each bean is examined by the light and its surface found to exhibit a power of light reflection equal to or greater than a predetermined amount, the bean is automatically removed from the plate member and falls into a receptacle. However, when the surface has a less power of light reflection, the bean is allowed to continue its travel with the plate member, finally to drop into a second receptacle. The beans are thus graded on a light reflecting or color basis which characteristic effectively serves as a criterion of quality in the case of coffee beans. The invention will be more completely understood when reference is made to the following description and the accompanying drawings in which Fig. 1 illustrates in elevation a multi-unit machine designed specially for grading coffee beans according to color and improved in accordance with the present invention; Fig. 2 shows an elevational view in perspective of a complete single unit of the improved machine; Fig. 3 is a perspective view depicting in diagram for clearness, certain parts of the improved machine including mechanism for transporting and presenting the beans individually to the light beam, also an exemplary circuit for the light-sensitive member and the amplifier accessory; Fig. 4 illustrates an enlarged longitudinal section of an air cylinder and valve assembly; Fig. 5 shows a section of the rotary plate member and a portion of the screws which carry the beans to the plate member; Fig. 6 is a side elevational view, partly broken away, of the plate member; while Fig. 7 illustrates a modification of the transporting and presenting means shown in the other figures.

Referring more particularly to Fig. 2, numeral 1 designates a main base plate upon which the various parts of the machine are mounted. Upstanding from the base plate and secured thereto in any suitable manner is a flanged foot member 2 which supports an upper auxiliary base plate 3. A pair of metal columns 4 of substantially rectangular cross section are bolted to the member 3 and bridged at the top by a plate 5. The columns 4 contain two oppositely disposed bearings 6 in which a horizontal shaft 7 rotates, as shown more clearly in Figs. 3 and 6. At one end of the shaft there is a gear 8 which engages with and is driven by a worm gear 9 (see Fig. 3) carried at the end of a shaft 10. At the opposite end of the shaft 10 a bevel gear 11 meshes with a gear 12 fixed to a shaft 13 which is driven by a motor 14. On the shaft 7, there is keyed a circular plate member 16, enlarged sectional views of which are shown in Figs. 5 and 6. This member constitutes one of the important structural features of my invention and has for its purpose the presentation of the beans or similar objects to the light beam as will be explained hereinafter. As the member 16 rotates, the beans are caused to adhere to the periphery thereof by suction, the member having a thickness sufficient to provide seating space at the periphery for objects of the optimum width. The plate member 16 has a series of radially directed holes or channels 17 equi-distantly spaced about the periphery and of a substantial depth, the holes communicating at the bottom with another group of holes or chambers 18 which have a direction normal thereto and which are equidistantly spaced around an imaginary circle on the side of the plate member and opening into this surface. The holes 17 are closed at the terminus on the plate periphery by sieve-like or apertured plugs 19, the purpose of which is to provide a substantially flat surface at these places having a uniform area of suction. The suction is produced by creating a partial vacuum at the under side of each plug, the withdrawn air being forced through the openings 17 into the holes 18 and thence expelled from the side of the plate member in the manner described presently. A nozzle 20, pressed sufficiently tight by springs 21 against certain of the openings 18, as shown more clearly in Figs. 3 and 5, receives the air from the plate member and directs it through a communicating pipe 22 into a device (not shown) which produces a partial vacuum in the system, for example, an inverse blower. The position of the nozzle and the number of openings subtended thereby depends largely upon the type and position of the conveyor employed for transporting the beans from the hopper to the rotating plate 16. The suction produced by the nozzle should be effective at the apertured plug nearest to the delivery end of the conveyor and should also include all the plugs along the upper quadrant of the plate periphery up to but not including the position where the bean intercepts the light beam. The reason for omitting the position where the light beam is intercepted, or rather the apertured plug at this position, from the suction effect will be apparent from the description given later; this position or plug is conveniently that uppermost on the plate periphery.

For conveying the beans from the hopper to the rotating plate member 16, I prefer to employ a plurality of parallel rotating screws 23 shown more clearly in Figs. 2 and 3. These screws are provided with a suitable bearing as indicated at 23' (see Fig. 5) at each end and are given a substantial incline with reference to the horizontal, having the higher end nearer the plate member. It has been found in practice that when the screws are inclined upwardly, the beans, as they are carried between the screws by the longitudinally moving threads tend to seat themselves in the threads in a uniform manner, also to separate into individual members during transit rather than in small groups. The amount of screw inclination as well as the pitch and rotation of the threads should be such as to produce the best condition for applying single beans or other objects to the apertured plugs as the plate member 16 moves past the upper ends of the screws. When coffee beans are to be sorted, which beans have a hemispherical contour bounded by a flat surface, it is desirable that the flat surface be presented to the periphery of the plate member. This surface gives considerably more stability in position and stronger adhesion to the said periphery when acted upon by the atmospheric pressure. Furthermore, the spherical surface offers greater accuracy of color determination. It will be understood that along the flat surface of an unroasted coffee bean there is a narrow green band or core which may give a false indication of the color to the light reflection determining device, if this surface were exposed to the light beam rather than the round surface. It is also apparent that the screws which are given an opposite rotation by mechanism described presently, preferably should not contact with one another and may be spaced apart a distance less than the smallest dimension of each object to be sorted. The mechanism for rotating the screws is preferably derived from a pair of worm gears 24, 24 which mesh with suitable gears 25, 25 on the shaft 13. Under the screws 23 there may be positioned in any suitable manner a pan or trough 26 of semi-circular shape to catch such beans as may be dropped by the screws. The beans are contained in a large hopper 27 or other suitable receptacle converging to a small exit through which the beans may be fed, preferably by gravity, onto the lower end of the rotating screws. In order to prevent clogging of the hopper, it may be desirable to employ a rotary paddle wheel of any well known and suitable design, one of the bearings of which has been indicated at 28 in Fig. 3. The wheel may be affixed to a shaft 29 and driven by a pair of gears 30, 31 and a chain 32 from the shaft 7 upon which the plate member 16 is mounted. There may also be provided a pair of parallelly aligned brushes 33, 33 whose bristles bear against the lower ends of the screws and which are positioned directly under the hopper exit to prevent spillage of those beans at this point which have not seated themselves on the moving threads. A large catch pan 34 may also be placed, if desired, under the brush position.

The apparatus for projecting light onto each object as it moves with the plate member 16 may consist of an incandescent lamp 35 (Figs. 2 and 3) and any suitable lens and prism system to concentrate the maximum amount of light on the moving object. The light beam should preferably impinge on the bean when in the uppermost position on the plate member. When the light strikes each bean, it is reflected onto a pair of photo-electric tubes 36, or other light sensitive apparatus connected in parallel in the input circuit of a thermionic amplifier 37. This circuit includes the usual battery for energizing the photo-electric tubes and furnishes a negative bias for the grid; other suitable sources of voltage may be employed to energize the amplifier plate circuit in the well understood manner. The current variations in the plate circuit caused by changes in the intensity of the reflected light flow through the transformer 38 and energize one of the coils of an electromagnetic device 39. This device may take the form of the actuating arrangement found in the usual type of electro-dynamic loud speaker and comprises a laminated core 40 provided with an air gap 41. A central core 42 projects into the gap. A coil 44 which surrounds the core 42 is connected to the secondary of the transformer and mounted in any convenient way so that it is free to move in the air gap and produce a movement of the cap 43 which may be made of parchment or other light material. The core 42 is also surrounded by a direct current energizing coil 45. Secured to the cap member there is a rod 46 connected to a diaphragm 47 of suitable flexible material such as rubber which closes one end of a chamber 48, as seen more clearly in Fig. 4. This chamber is supplied with air under pressure from a pipe 49, the air escaping as a fast moving jet when the rod 46 is moved lengthwise to open a needle valve 50 seated on the interior of the entrance of a relatively long directing nozzle 51. This valve is connected to the rod 46 through the diaphragm by means of a metallic rod 46'. It is apparent that the air under pressure in chamber 48 acts not only against the valve tightly to seat the same but also against the diaphragm 47 and in this manner the pressure exterted at the valve is counterbalanced so as to minimize the force necessary to open the latter.

As stated hereinbefore, the beans or other objects to be sorted are delivered individually to the rotating plate member by the rotating screws and due to the suction provided at the apertured plugs the beans are individually held at each of these positions on the periphery of the plate member. The beans travel upwardly when the plate is rotated clockwise as seen in Fig. 3, until the beans reach the uppermost position. At this position there is no suction so that each bean is held solely by gravity. When the light reflecting power of the bean surface is equal to or greater than a predetermined amount, the light reflected activates the photo-electric tubes in such a degree as to render the grid of the amplifier sufficiently positive or less negative to cause plate current to flow. The negative bias on the grid normally prevents the flow of current when the photo-electric tubes are inactive. When current flows under the conditions stated, the rod 46' of the electro-dynamic device is moved to the left, allowing air to escape past the valve 50 and the resulting air jet strikes the bean to force it into a chute 52 which communicates with a collecting pan 53. In order that the chute 52 will be positioned as near to the bean as possible during this operation, thereby preventing spillage, it may be desirable to reduce the thickness of the plate at its periphery, as indicated at 54, to accommodate the end of the chute so as to leave an active peripheral width on the plate member not greater than the bean dimension. When the light reflecting power of the bean at the uppermost position on the rotating plate member is less than the predetermined amount the activation of the photo-electric device is less than that necessary to actuate the device 39 and hence the bean is allowed to continue its travel with the plate member and falls through a chute 55 into a pan 56.

It will be apparent that the beans which have the greater light reflecting power are those of the lighter colors, hence of the better grade, so that the sorting device as described, operates to force the good beans through the chute 52, whereas the poorer quality beans are allowed to pass into the chute 55. Otherwise stated, the jet is operated when a good bean intercepts the light beam and this arrangement I have found to be preferable over that in which a bad bean would cause operation of the jet. It appears that the accuracy of sorting is greater under the described conditions of operation although it will be understood that if desired the circuit arrangement may be modified in the well understood manner to become energized when a bad bean passes the light spot. It will also be understood that any suitable form of amplifying systems and devices including a grid controlled arc device, energized completely from an alternating current source may be satisfactorily employed, in which case, the compressed air valve operating mechanism would be modified accordingly.

A machine such as described, may be adjusted to sort beans and similar objects quite accurately at considerable speed. Moreover, the compactness of structure and simplicity of operation lends the machine readily to multi-unit control and operation; thus in Fig. 1 there is shown a battery of five complete units supported from a common base plate 57 and driven by a single motor 58. The suction effect in each machine may be provided through a common pipe 59, and a source of compressed air may also be used in common as indicated by the pipe line 60. The gearing for driving the plate members 16 and the hopper paddle wheels or other form of stirring device may conveniently be mounted on the same shafting throughout the various units all of which considerations are favorable to the practical application of the machine to the sorting of coffee beans on a large commercial scale.

Another mechanism for presenting the beans individually to the light beam is a cascade arrangement of moving belts as exemplified in Fig. 7. A plurality of horizontal belts 61, 62, 63 may be arranged edge to edge and moved at different linear velocities, the belt 63 which moves under the light beam having the greatest speed. The beans after being dropped from the hopper 64 are constrained to move from one belt to the next by means of vertically disposed belts 65, 65, also moving at different linear velocities and each of which overlap two of the horizontal belts in the manner shown. The shafts which carry the belt pulleys may be driven in any suitable and well known manner from a common source of rotary power. It is apparent that inasmuch as the speed of the beans in moving from the hopper to the position in which it intercepts the light beam is instantly changed at the moment they leave one belt and move onto the next, the beans are automatically separated and the distances between each pair of beans becomes a factor depending on the relative velocities of the movable belts. The beans are thus presented to the light beam in single file and at such a rate as to insure the positive operation of the electro-mechanical device indicated as a rectangle 66 which controls the air jet in the same manner as described with reference to Fig. 3. Instead of employing a rotary paddle wheel in the hopper to prevent the beans from clogging, as shown in Fig. 2, there may be utilized a worm 67 vertically or horizontally disposed depending on the type of hopper employed which worm may rotate in a central bearing 68 and carry the beans on the threads through the hopper nozzle to the first moving belt.

What I claim as new and desire to secure by Letters Patent of the United States is:

1. In color sorting apparatus, the combination of a light source and a cooperating light-sensitive member, a receptacle adapted to contain a plurality of similar irregular objects to be sorted according to color, means for presenting the objects individually to the light beam whereby light is reflected by each object in a degree according to its color onto the light-sensitive member, means operated by said member for sorting the objects, and means for transporting the objects from the receptable to the said presenting means and for segregating the objects in transit, said transporting and segregating means comprising inclined parallelly rotating screws between which the objects are carried by the threads and thereby given a uniform arrangement when offered to the presenting means and on which the objects become uniformly positioned at their elevated ends.

2. In color sorting apparatus, the combination of a light-source and a cooperating light-sensitive member, a receptacle adapted to contain a plurality of similar irregular objects to be sorted according to color, means for presenting the objects individually to the light beam whereby light is reflected by each object in a degree according to its color onto the light-sensitive member, means operated by said member for sorting the objects and means for transporting the objects from the receptacle to the said presenting means and for segregating the objects in transit, said transporting and segregating means comprising inclined parallelly rotating screws, the screws being spaced apart a distance less than the smallest dimension of each object and provided with a uniform pitch such that the objects are constrained to move between the screws and are carried upwardly by the threads thereof, being thereby given a uniform and similar arrangement when offered to the presenting means.

3. In color sorting apparatus, the combination of a light source and a cooperating light-sensitive member whose resistance changes in accordance with the degree of light activation, a hopper for containing similar irregular objects to be sorted, a movable surface adapted to receive the objects from the hopper and to present them individually to the light beam whereby light is reflected by each object in a degree according to its color onto the light-sensitive member, the normal direction of travel of the objects being toward a receiving compartment, and means for transporting the objects from the hopper to the movable surface and for segregating the objects in transit, said means comprising parallelly arranged inclined rotating screws between which the objects are carried by the threads and by which they are given a uniform arrangement to be received by the movable surface, means for energizing the light-sensitive member, and means responsive to changes of current in said light-sensitive member for diverting an object away from the normal path when its light reflecting power is different from a predetermined amount.

4. In color sorting apparatus, the combination of a light source and a cooperating light-sensitive member whose resistance changes in accordance with the degree of light activation, a hopper for containing similar irregular objects to be sorted, a movable surface adapted to receive the objects from the hopper and to present them individually to the light beam whereby light is reflected by each object in a degree according to its color onto the light-sensitive member, the normal direction of travel of the objects being toward a receiving compartment, and means for transporting the objects from the hopper to the movable surface and for segregating the objects in transit and for giving them a uniform arrangement, said means comprising parallelly arranged screws rotating in opposite direction and inclined upwardly toward the movable surface whereby the objects are carried by the threads and appropriately turned thereby to effect uniformity, means for energizing the light-sensitive member, and means responsive to changes of current in said light-sensitive member for diverting an object away from the normal path when its light reflecting power is different from a predetermined amount.

5. In color sorting apparatus, the combination of a light source and a cooperating light-sensitive member whose resistance changes in accordance with the degree of light activation, a hopper for containing coffee beans to be sorted, a movable surface adapted to receive the beans from the hopper and to present them individually to the light beam whereby light is reflected by each bean in a degree according to its color and to the light-sensitive member, the normal direction of the travel of the beans being toward a receiving compartment and means for transporting the beans from the hopper to the movable surface and for segregating the beans and for arranging them in a similar uniform manner in transit, said means comprising inclined parallelly arranged rotating screws between which the beans are carried by the threads, and means positioned near the outlet of the hopper and arranged longitudinally of the screws for constraining the beans to the screw arrangement, means for energizing the light-sensitive member and means responsive to changes of current in said light-sensitive member for diverting a bean away from the normal path when its light reflecting power is different from a predetermined amount.

6. In color sorting apparatus the combination of a light source and a cooperating light-sensitive member, a hopper adapted to contain a plurality of objects to be sorted according to color, means for presenting each object while in motion to the light beam and means responsive to the amount of light reflected by each object onto the light-sensitive member for sorting the objects according to color, said means comprising a rotary plate member provided with a plurality of chambers which terminate at the periphery of said plate member in equi-distantly spaced openings, means for producing a partial vacuum in one or more of said chambers whereby the suction causes the objects to adhere to the peripheral surface of the plate member, means for receiving objects from the hopper and for presenting them individually to the rotating plate member, said receiving and presenting means being constituted of a rotary screw arrangement which extends between the hopper and the plate member and which is constructed and arranged to present the objects in a similar and uniform manner to the plate member.

7. In color sorting apparatus, the combination of a light source and a cooperating light-sensitive member, a hopper adapted to contain a plurality of objects to be sorted according to color, means for presenting each object to the light beam and means responsive to the amount of light reflected by each object onto the light-sensitive member for sorting the objects according to color, said means comprising a rotary plate member provided with a plurality of chambers which terminate at the periphery in equi-distantly spaced openings, means for producing a partial vacuum in one or more chambers whereby the pressure of the atmosphere causes the objects to adhere to the peripheral surface of the plate member, means for receiving objects from the hopper and for presenting them individually to the rotating plate member, said receiving and presenting means being constituted of parallelly arranged screws rotating in opposite directions and extending between the hopper and plate member, said screws being inclined upwardly toward the plate member.

WALTER R. HORSFIELD.